A. S. HATCH.
WELDING MACHINE.
APPLICATION FILED JAN. 10, 1913.

1,145,413.

Patented July 6, 1915.
5 SHEETS—SHEET 4.

Fig. 5.

Witnesses:
Harry S. Gaither
Carolyn Weber

Inventor
Austin S. Hatch
by Thomas H. Ferguson
Atty

UNITED STATES PATENT OFFICE.

AUSTIN S. HATCH, OF DETROIT, MICHIGAN, ASSIGNOR TO THOMAS H. FERGUSON, OF OAK PARK, ILLINOIS.

WELDING-MACHINE.

1,145,413.   Specification of Letters Patent.   Patented July 6, 1915.

Application filed January 10, 1913. Serial No. 741,258.

*To all whom it may concern:*

Be it known that I, AUSTIN S. HATCH, a citizen of the United States, residing at Detroit, county of Wayne, State of Michigan, have invented certain new and useful Improvements in Welding-Machines, of which the following is a specification.

The present invention relates to electric welding machines and the principal object of the invention is to provide a machine which shall be simple in construction and efficient in operation, while having its parts readily accessible for purposes of inspection, repair and replacement.

One feature of the invention consists in novel means for adjusting the welding terminals to adapt them for service upon work of different dimensions; a second in novel means for bringing the terminals into operative engagement with the material to be welded upon each welding operation; a third in a novel arrangement of these terminals with magnetic means for insuring the proper heating of the material to be welded; a fourth in a novel transformer core construction and mounting; and a fifth in the general arrangement of the frame, core and windings, and the working terminals and their supports. According to this latter feature, the iron used to mechanically hold the parts in place is located, as far as possible, within the windings to prevent magnetic leakage and consequent waste of energy. These several features, together with other features and advantages, will be best understood upon reference to the following detailed description taken in connection with the accompanying drawing, and the scope of the invention will be particularly pointed out in the appended claims.

In the drawing, Fig. 3 is an end elevation viewed from the left in Fig. 1.

In the drawing, 10 designates the base, which may be of any suitable shape. This base is provided at its upper end with a plate 11 which constitutes part of the frame structure. The transformer core 12 is supported upon this plate 11 and consists of the usual laminations of iron employed in transformer construction. Angle irons 13, 14, 15 and 16, which constitute frame members of the machine, serve to clamp these laminations together and to hold them in place. Bolts 17, 18 and 19 extend horizontally between the angle irons 13 and 14, 17 and 18 at one end of the core, and 19 at the other. By turning up the nuts on these bolts, the laminations may be compactly held between these angle irons. To provide for the proper spacing, spacing sleeves, such as 20, are provided on the exteriors of these bolts and engage the vertical webs of the angle plates at their opposite ends. These spacers are preferably of non-magnetic material. Just as the bolts 17, 18 and 19 connect the vertical webs of the angle irons 13 and 14, the bolts 21, 22 and 23 connect the vertical webs of the angle irons 15 and 16 located at the upper edge of the core. This provides for the clamping of the laminations of the core. To secure this structure to the plate 11, the horizontal webs of angle irons 13 and 14 are connected to the plate 11 by bolts 24 and 25. Bolts 26, 27, 28, 29 connect the upper and lower angle irons, passing through their horizontal webs and being provided with suitable nuts and spacing sleeves 30. These spacing sleeves 30, which are preferably composed of non-magnetic material, serve to accurately aline and hold the frame members when the nuts on the bolts are tightened up.

Figure 1:
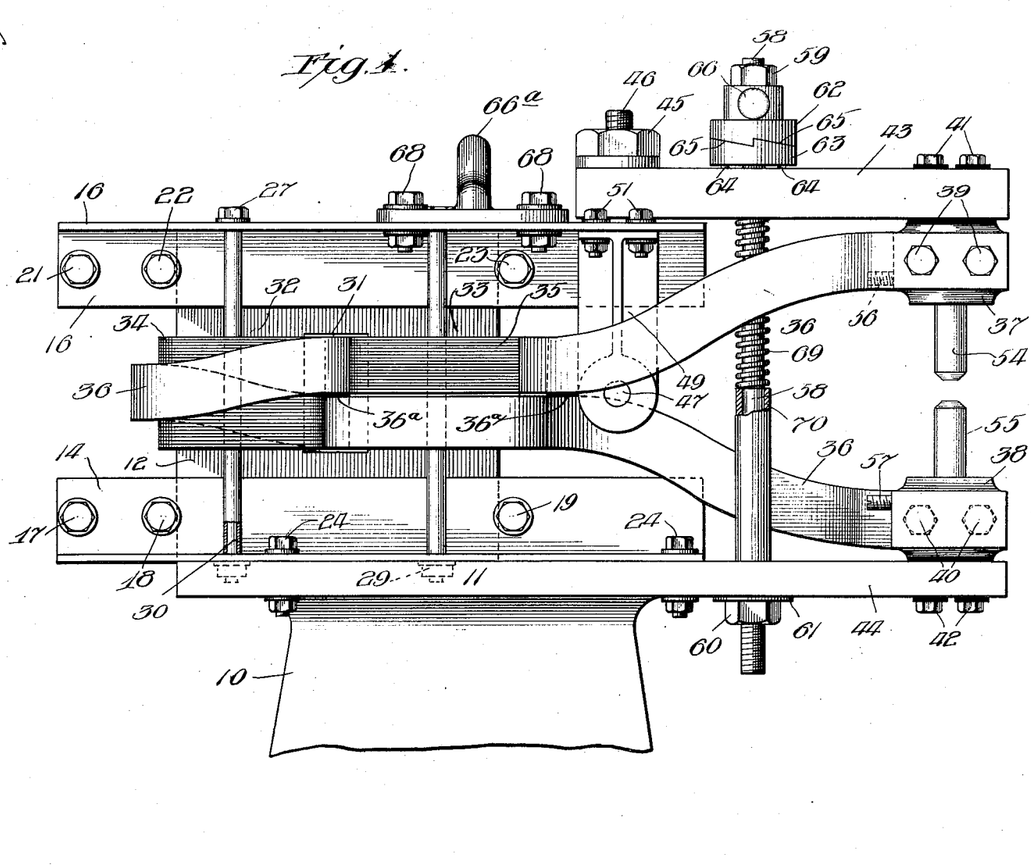
Figure 1 is a side elevation of a welding machine constructed in accordance with my invention.

The laminations which form the core 12 are each provided with a central aperture 31 so as to leave two vertical portions 32 and 33. Around these the primary and secondary windings of the transformer are disposed. The bolts 26, 27, 28, 29 are also inclosed by these windings, thereby adding to the cross-section of the magnetic path through the iron, while maintaining a strong and effective mechanical arrangement. The primary windings consist of two coils 34 and 35 located, respectively, upon the upright portions 32 and 33 of the core. These windings consist of a large number of turns and are to be connected in series or otherwise, as desired, to a suitable electric current supply. The secondary winding 36 is made up of a number of laminations or strips of copper or like conducting material and is given but a few turns about the core. These turns are preferably as illustrated, a single turn being made about each of the primary windings 33 and 34 and the ends of the secondary conductor being brought out away from the frame structure and connected to terminal blocks 37 and 38 in any suitable way, as by bolts 39 and 40, respectively. As viewed in Fig. 1, the course of this secondary winding 36 may be readily followed. It extends from terminal 37, to the face of which it is secured, toward the core, passing around behind the primary winding 35, forward through the opening 31, to the left across the front of primary winding 34, thence around the rear of the latter turning toward the right, then through the opening 31, across the face of the primary winding 35 toward the right, thence receding along the right-hand face of the winding 35, and finally curving outward to the far side of the terminal 38, to which it is secured. Where the turns of the secondary winding 36 cross each other they are insulated from each other as at 36ª, to prevent shortcircuiting.

Figure 2:
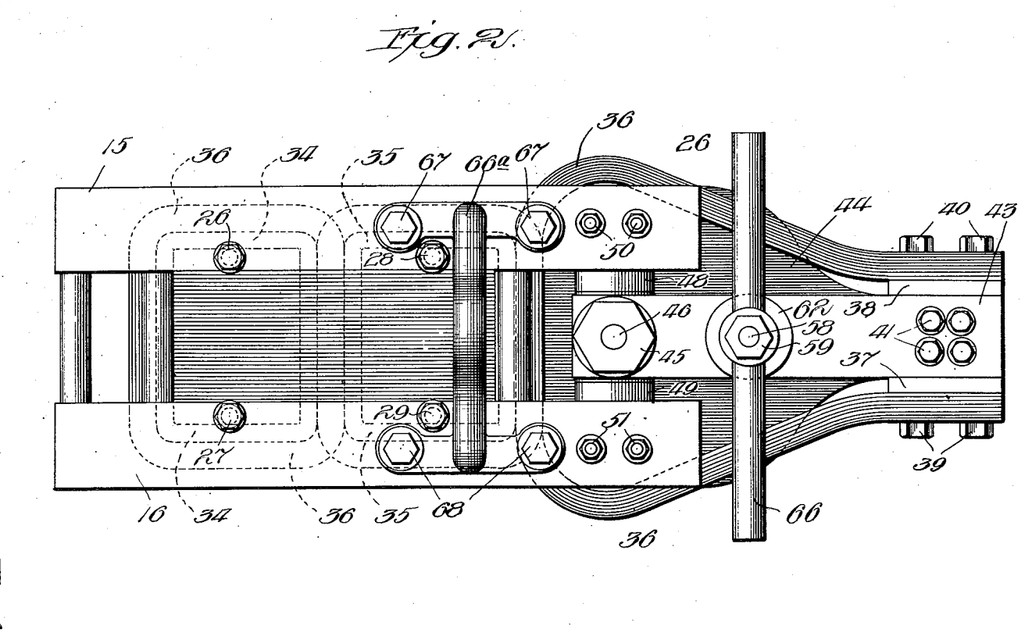
Fig. 2 is a plan view of the same.
Figure 4:
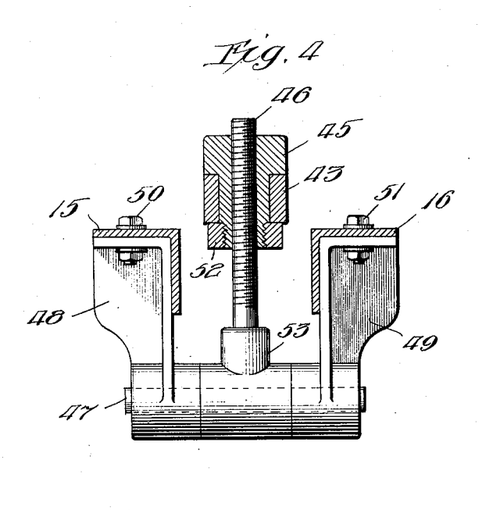
Fig. 4 is a detail view illustrating the mechanism for adjusting the upper terminal support.

Terminals 37 and 38 are firmly secured by bolts 41 and 42, respectively, to the outer ends of the supports 43 and 44. The latter is provided by extending the plate 11 and decreasing it in width, as illustrated in Fig. 2. This support is therefore rigid. The support 43, on the other hand, consists of a separate member which is movably secured at its inner end and arranged for vertical adjustment. This is to adapt the machine for service upon work of varying dimensions. This adjustment is accomplished by securing the inner end of the support 43 to a sleeve 45 and threading the latter upon a vertical rod 46 which is pivotally secured at its lower end by a pivot 47 to brackets 48 and 49 extending downward from the angle irons 15 and 16, being secured to the horizontal webs of the latter by bolts 50 and 51, respectively. A nut 52 is threaded upon the lower end of the sleeve 45 after the latter and support 43 have been assembled. The rod 46 is also preferably provided with a T-shaped head 53 which accurately fits between the bearings formed at the lower ends of the brackets 48 and 49, the pivot pin 47 passing through these bearings and the head 53.

The terminal blocks 37 and 38 of the secondary winding 36 are provided with alined welding points or terminals 54 and 55. These may be secured in any suitable way to the terminal blocks 37 and 38. As illustrated, they are set in openings in the latter and are held in position by set screws 56 and 57, respectively. In order to bring these welding terminals 54 and 55 into operative engagement with the material to be welded, the rod 58, and its associated parts, is employed. This rod extends vertically through openings in the supports 43 and 44 and is threaded at its opposite ends for the reception of nuts 59 and 60, the latter being separated from the support 44 by a washer 61. At the upper end of the rod 58, two coöperating cam members 62 and 63 are located. The latter is provided, on its under side, with pins 64 which set into openings in the upper face of the support 43 and, on its upper side, with a series of inclined faces 65. Because of the engagement of the pins 64 with the support 43, this cam member 63 cannot be rotated. The coöperating cam member 62, however, is free to rotate about the rod 58. Handles or levers 66 extend outward from opposite sides of this cam member 62. The under face of the cam member 62 is provided with a series of inclined faces which coöperate with the faces 65 upon the cam member 63. As the member 62 is rotated upon the member 63, the coöperating cam faces force the support 43 downward and thereby bring the welding terminals 54 and 55 into engagement with the material to be welded. By one adjustment of the nut 59, this operative engagement of the terminals 54 and 55 with the work may be brought about by partially rotating the cam member 62 and then returning it to its initial position. By a different adjustment, this engagement of the terminals with the work may be brought about only when the cam faces on the member 62 pass from one set of faces 65 on the cam member 63 to the next. With this latter adjustment, a continuous rotation of the cam member 62 in one direction will bring about successive and repeated engagements of the terminals 54 and 55 with the work. After each engagement of the terminals with the work, they are restored to normal position by coiled spring 69 acting between support 43 and a sleeve 70 engaging the spring at one end and support 44 at the other. Preferably, both spring 69 and sleeve 70 are threaded upon rod 58 and all three—spring, sleeve and rod—are composed of non-magnetic material.

For convenience in handling the mechanism, a yoke 66ª is provided. This yoke extends between the angle irons 15 and 16 at the upper portion of the frame structure and is secured to the horizontal webs of the latter by bolts 67 and 68. When it is desired to shift the machine from point to point, the hook of suitable hoisting and conveying mechanism may be passed under this yoke and the machine readily lifted and shifted as desired.

In operation, current is supplied to the primary windings 34 and 35. Ordinarily, this current will be of the usual commercial potential and amperage. By reason of the ratio of the number of primary and secondary turns, the current induced in the secondary winding 36 will be of low voltage and high amperage. When the work to be welded has been inserted between the welding terminals 54 and 55, after suitable adjustment of the support 43 to suit the dimension of the work, each pull upon one of the handles 66 will close the secondary circuit through the parts to be welded and the resulting heavy flow of current, combined with the pressure exerted by the terminals, will be sufficient to properly heat and weld the parts.

Figure 5:
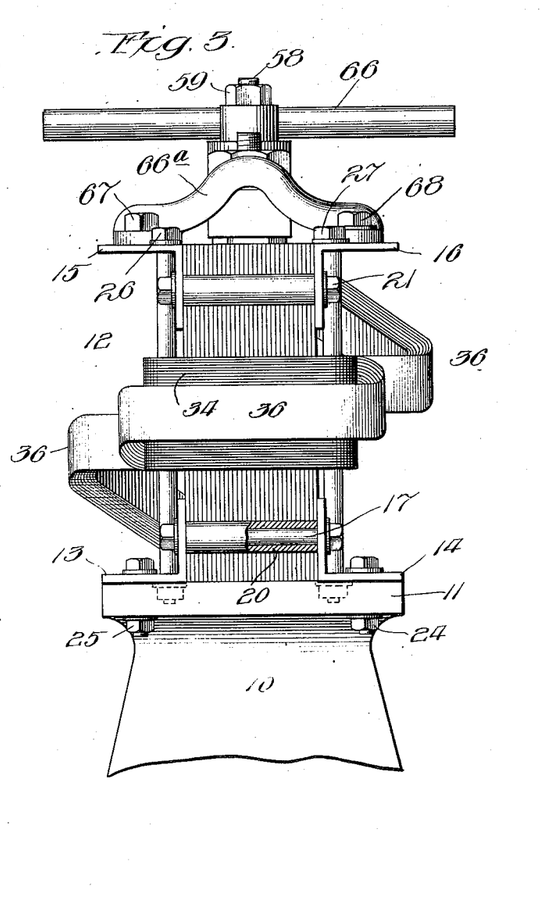
Fig. 5 is a side elevation of a second machine illustrating a different frame, core and terminal construction and arrangement.
Figure 6:
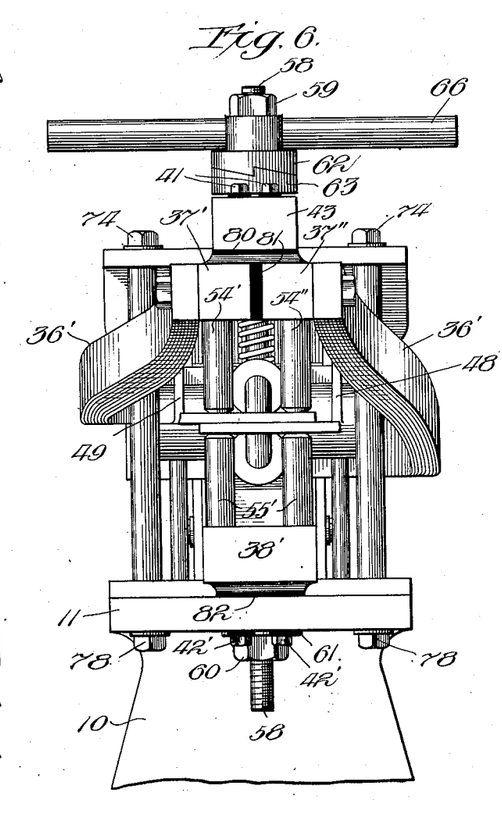
Fig. 6 is an end elevation of this latter machine viewed from the right in Fig. 5.
Figure 7:
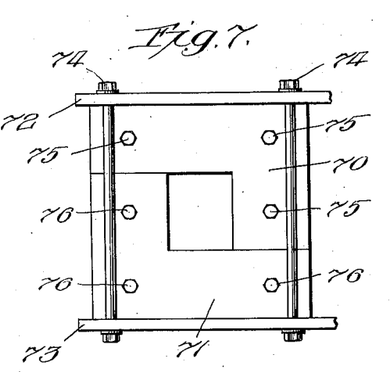
Fig. 7 is a side elevation of the transformer core and mounting of this latter machine, drawn to a smaller scale.

In the form of the invention illustrated in Figs. 5, 6 and 7, the arrangement of the windings upon the core, and the arrangement of the terminal supports and the means for adjusting and operating them, are the same as in the form of the invention illustrated in Figs. 1 to 4, inclusive. In the second form of the invention, however, the core and frame construction and the arrangement of the welding terminals is somewhat different. The transformer core is made up of two sections or bundles of laminations 70 and 71, clamped together between the frame members 72 and 73 by vertical bolts 74, as clearly illustrated in Figs. 5 and 7. This arrangement is provided especially for convenience in assembling and disassembling for the purposes of repair and inspection. The laminations of the section 70 are held together by transverse bolts 75, while the corresponding laminations of section 71 are similarly held together by bolts 76. Thus, each section may be made up as a separate unit. They are then assembled by fitting them together, as shown in the drawing. When placed between the plates 72 and 73 with the bolts 74 in position and their nuts screwed down, a compact and efficient arrangement is provided. With this core construction, the primary windings 34, 35, and the secondary winding 36' are disposed as in the case of the core of the machine of Fig. 1. But in assembling windings upon the core, the windings may be first made up and then the core sections slipped into place through them and the whole clamped together by the plates 72, 73, and the bolts 74. By reason of the proximity of the bolts 74 to the sides of the core, they are embraced within the primary windings 34, 35, and so add to the cross-section of the magnetic path through the iron. This frame and core construction is then mounted upon the plate 11 of the base 10 in any suitable manner. In the present instance, short bolts 77 secure the plates 11 and 73 at one end, and long bolts 78 connect these same plates at the other end and also serve to space the plates 72 and 73. This is accomplished by passing these bolts down through these three plates and providing a spacing sleeve 79 between the plates 72 and 73. In order to prevent magnetic leakage, these bolts 78 and their sleeves 79 are composed of non-magnetic material. The upper terminal support 43 is secured to the upper frame plate 72 by means of brackets 48 and 49, just as it was secured to the upper angle irons 15 and 16 of the form of the machine illustrated in Fig. 1.

Figure 8:
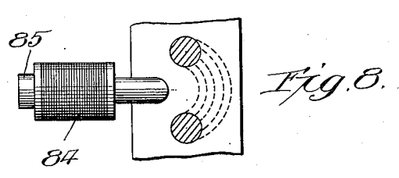
Figs. 8 and 9 illustrate the action of the magnet associated with the welding terminals of this latter machine. Throughout these figures, like characters refer to like parts.

In the machine of Fig. 5, the secondary winding 36' leads to terminal blocks 37', 37'', mounted upon the outer end of the support 43 and insulated from that support by suitable insulation 80 and from each other by suitable insulation 81. A bridging terminal 38' is mounted upon the outer end of the lower support 44 and is suitably insulated from it by insulation 82. In this form of the invention, the terminal blocks 37' and 37'' are provided, respectively, with welding terminals 54' and 54''. These welding terminals are, respectively, in alinement with two welding terminals 55' secured to the terminal block 38'. These welding terminals may be secured in any suitable way. As illustrated, they are set in openings in the terminal blocks and held in place by set screws 83 and 84, just as in the case of the corresponding parts in Fig. 1. By reason of this arrangement of the parts, the secondary circuit is completed between the terminals of the secondary winding 36' by passing either through terminal block 37', welding terminal 54', one welding terminal 55', block 38', the other welding terminal 55', welding terminal 54'' and terminal block 37'', or in the reverse direction according to the direction of flow of current at the instant considered. With the arrangement of the parts illustrated in this form of the invention, two overlapping strips may be welded together at two points, the metal between terminals 54' and 55' being heated and welded, and the metal between terminals 55' and 54'' being also heated and welded. Where the resistance to the flow of current between terminals 54' and 54'' is less through the material worked upon than through the highly conductive path provided by terminals 55' and terminal block 38', then I use the electromagnet 85 and connect its windings 86 into circuit with some suitable source of supply in order to repel the path of the current through the work and thereby increase the resistance to its flow through the material worked upon and cause it to take the path of less resistance through the terminals 55' and terminal block 38'. The effect of the magnet 85 upon the path of the current through the material is illustrated in Fig. 8.

Figure 9:
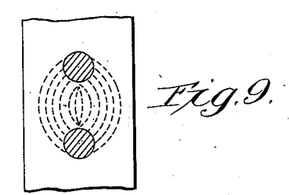

In Fig. 9, the path of the current is illustrated in the case where no electromagnet is employed. In this case, the current finds a relatively short path of considerable cross-section. In the case where the electromagnet is employed, the lines of force, produced by the magnet, repel and the current is forced to take a longer path through the material. When the resistance of this increased path exceeds that through the terminals 55' and block 38', then the current will take this latter path. Magnet 85 may be mounted in any suitable way, as upon the bracket 87, secured to the lower support 44 by bolt 88. In this form of the invention, the terminals are adjusted to suit the dimensions of the work and are actuated to bring about the welding operation in just the same way as in the case of the machine of Fig. 1. Each pull upon the handle 66 will close the secondary circuit of the winding 36', as we have just seen, and the metal will be heated and welded.

In carrying out my invention, I do not wish to be limited to the precise matter herein disclosed, but realize that many alterations and modifications may be made without departing from the spirit and scope of my invention. I therefore aim to cover all such alterations and modifications by the terms of the appended claims.

What I claim as new and desire to secure by Letters Patent of the United States is:—

1. An electric welding machine comprising a frame having upper and lower frame members, a laminated core located between said frame members, primary and secondary windings on said core, alined welding terminals, substantially parallel supports for said terminals extending outward from the ends of said upper and lower frame members, respectively, at substantially right angles to said terminals, a pivotal connection between said frame and one of said supports, the pivot of such connection lying between the said core and terminals and the pivot of such connection and the welding point lying in a line substantially parallel to said supports, and means acting upon said supports to bring said terminals into operative engagement with the work.

2. An electric welding machine comprising a frame, a laminated core embraced by said frame, primary and secondary windings on said core, alined welding terminals, substantially parallel supports for said terminals extending at substantially right angles to said terminals, one of said supports being rigidly secured to said frame, a pivotal connection between the other of said supports and said frame, means for adjusting said latter support upon said connection toward and from said first mentioned support, and means acting upon said supports to bring said terminals into operative engagement with the work.

3. An electric welding machine comprising a frame, a laminated core, primary and secondary windings on said core, alined welding terminals, substantially parallel supports for said terminals extending at substantially right angles to said terminals, a carrying member for one of said supports pivoted to said frame at a point forming with the welding point a line substantially parallel to said supports, means for adjusting the support on said carrying member toward and from said other support, and means acting upon said supports to bring said terminals into operative engagement with the work.

4. An electric welding machine comprising a frame, a laminated core, primary and secondary windings on said core, welding terminals, substantially parallel supports for said terminals extending outward from said frame, an adjustable sleeve to which the inner end of one of said supports is secured, a rod upon which said sleeve is threaded extending at substantially right angles to said support, a pivot connecting the inner end of said rod to said frame, and means for actuating said supports to bring said terminals into operative engagement with the work.

5. An electric welding machine comprising a frame having upper and lower horizontal members, a core having vertically disposed laminated sheets secured within said frame between its said upper and lower members, horizontally disposed primary windings upon the vertical portions of the core, similarly disposed secondary windings of laminated copper surrounding said primary windings, supports extending outward from the upper and lower portions of said frame, welding terminals extending toward each other from the outer ends of said supports, and means extending between said supports and operative to actuate them to bring said terminals into operative engagement with the work.

6. An electric welding machine comprising a core of vertically disposed laminations, upper and lower frame members, vertical bolts on either side of said core uniting said frame members, horizontally disposed primary windings surrounding the vertical portions of said core and said bolts, similarly disposed secondary windings of laminated copper surrounding said primary windings, supports extending outward from the upper and lower frame members, welding terminals extending toward each other from the outer ends of said supports, and means extending between said supports and operative to actuate them to bring said terminals into operative engagement with the work.

7. An electric welding machine comprising a core of vertically disposed laminations, upper and lower frame members bearing upon the upper and lower edges of the core laminations, vertical bolts on either side of said core uniting said frame members and securely clamping said core, horizontally disposed primary windings surrounding the vertical portions of said core and said bolts, similarly disposed secondary windings of laminated copper surrounding said primary windings, supports extending outward from the upper and lower frame members, welding terminals extending toward each other from the outer ends of said supports, and means extending between said supports and operative to actuate them to bring said terminals into operative engagement with the work.

8. An electric welding machine comprising a core of two sections of vertically disposed laminations, upper and lower frame members bearing upon the upper and lower edges of said core, vertical bolts on either side of said core uniting said frame members and securely clamping said core, horizontally disposed primary windings surrounding the vertical portions of said core and said bolts, similarly disposed secondary windings of laminated copper surrounding said primary windings, supports extending outward from the upper and lower frame members, welding terminals extending toward each other from the outer ends of said supports, and means extending between said supports and operative to actuate them to bring said terminals into operative engagement with the work.

9. An electric welding machine comprising a frame, a laminated core, primary and secondary windings upon said core, supports extending outward from said frame, a pair of welding terminals mounted upon the outer end of one of said supports and insulated from it and each other and connected electrically to the ends of said secondary winding, a second pair of welding terminals mounted upon, and insulated from, the outer end of the other of said supports and electrically connected, said second pair being in alinement with and coöperating with said first pair in the welding operation, and means for bringing said pairs of terminals into operative engagement with the work.

10. An electric welding machine comprising a frame, a laminated core, primary and secondary windings on said core, supports extending outward from said frame, a pair of welding terminals mounted upon the outer end of one of said supports and insulated from it and each other and connected electrically to the ends of said secondary winding, a second pair of welding terminals mounted upon, and insulated from, the outer end of the other of said supports and electrically connected, said second pair being in alinement with and coöperating with said first pair in the welding operation, means for bringing said pairs of terminals into operative engagement with the work, and means for compelling the current induced in said secondary winding to pass from one to the other of said first pair of terminals by way of said second pair rather than directly through the work.

11. An electric welding machine comprising a frame, a laminated core, primary and secondary windings on said core, supports extending outward from said frame, a pair of welding terminals mounted upon the outer end of one of said supports and insulated from it and each other and connected electrically to the ends of said secondary winding, a second pair of welding terminals mounted upon, and insulated from, the outer end of the other of said supports and electrically connected, said second pair being in alinement with and coöperating with said first pair in the welding operation, means for bringing said pairs of terminals into operative engagement with the work, and an electromagnet having its poles located adjacent to and between the terminals of each pair and operative to compel the current induced in said secondary winding to pass from one to the other of said first pair of terminals by way of said second pair rather than directly through the work.

12. An electric welding machine comprising a pair of welding terminals suitably spaced and insulated from each other and operative to engage one side of the work at different points, a second pair of welding terminals electrically connected together and operative to engage the other side of the work at points opposite the points of engagement of said first pair, electrical connections to the terminals of said first pair for supplying welding current, means for bringing said pairs of terminals into operative engagement with the work, and a magnet having its poles arranged to lie on opposite sides of said work at points substantially intermediate of the terminals of each of said pairs of welding terminals, respectively, whereby welding current passes through said work at the points engaged by said welding terminals.

13. An electric welding machine comprising a pair of welding terminals suitably spaced and insulated from each other and operative to engage one side of the work at different points, a second pair of welding terminals electrically connected together and operative to engage the other side of the work at points opposite the points of engagement of said first pair, electrical connections to the terminals of said first pair for supplying welding current, means for bringing said pairs of terminals into operative engagement with the work, and means for diverting the current from the path otherwise open to it from one terminal of said first pair to the other terminal of said pair directly through the work.

In witness whereof, I hereunto subscribe my name this 3rd day of January, 1912.

AUSTIN S. HATCH.

Witnesses:
J. M. PATERSON,
W. B. F. BROWN.